Patented Dec. 7, 1948

2,455,425

UNITED STATES PATENT OFFICE 2,455,425

PRODUCTION OF NITROPARAFFINS

Norman Levy, Charles William Scaife, and Dorothy Shaw Turner Bryson, Norton-on-Tees, England, assignors to Imperial Chemical Industries Limited, a corporation of Great Britain No Drawing. Application July 18, 1946, Serial No. 684,554. In Great Britain July 30, 1945

2 Claims. (Cl. 260—644)

This invention relates to the production of nitroparaffins.

It is known that nitroparaffins can be produced by the nitration of the corresponding paraffins in the vapour phase by means of nitric acid, or by means of nitrogen dioxide and a catalyst, but so far as we are aware there has been no disclosure that 2,2 and 1,2 dinitroparaffins can be produced by the vapour phase nitration of paraffins.

According to the present invention there is provided a process for the production of 2,2-dinitropropane and/or 1,2-dinitroisobutane, which comprises heating isobutane, or gas mixtures containing it, with nitrogen dioxide in the vapour phase. It is preferred to use substantially pure nitrogen dioxide as nitrating agent.

Reaction temperatures of 190°–300° C. may be employed. Temperatures of 250°–280° C. are preferred. The reaction may be carried out at atmospheric pressure or under pressures greater than atmospheric. Contact times (corrected to 20° C. at atmospheric pressure) of 90–180 seconds are suitable, but a contact time of about 120 seconds is preferred. It is desirable that the reactants should be substantially dry.

In general the ratio by volume of nitrogen dioxide to hydrocarbon should be as high as possible but it should not be greatly in excess of 2:1.

The converter or reaction chamber may be of heat resistant glass, such as that known under the registered trade mark "Pyrex", or of any other impermeable vitreous, ceramic or refractory material inert to the reactants and products. It should be free from materials giving rise to any of the oxides of iron in uncombined form. A reaction chamber of the type mentioned in U. S. application No. 612,136 is very suitable for the purpose. This comprises a converter provided with a lining which is not sealed to the walls of the converter, said liner having its inner surface and preferably all its surfaces of vitreous, ceramic or refractory material in which there is substantially no uncombined oxide of iron, particularly ferric oxide, or substances capable of giving said oxides when exposed to the reactants or products. The converter may, if desired, be packed with pieces of refractory material such as heat-resistant glass.

The dinitroparaffins are separated, for example, by the following sequence of operations: collecting the reaction products in a cooled catchpot; degassing by suction or by bubbling carbon dioxide through the liquid; washing with water; drying with calcium chloride; separating the oily layer from the calcium chloride; removing the mono-nitroparaffins by fractional distillation under reduced pressure, for example, less than 2 mm. It is generally undesirable to employ steam distillation for separating the dinitroparaffins.

The invention is illustrated but not limited by the following example.

Example

A gaseous mixture comprising 70% isobutane and 30% normal butane was well mixed with twice its volume of pure nitrogen tetroxide and the mixed gases were dried by passage through phosphorus pentoxide and were passed through a "Pyrex" glass converter, which was maintained at 260° C. The gas flow was controlled to give a contact time of 120 seconds (corrected to 20° C. at atmospheric pressure).

The product was collected in a cooled catchpot and was freed from nitrogen tetroxide by bubbling carbon dioxide through it. The oil was washed with water and dried over calcium chloride. The pass conversion of butanes to crude dry, washed oil was about 25% by weight.

The dinitro-paraffins were recovered, after distilling off the mono-nitroparaffins at 25°–30° C. under high vacuum (about 1 mm.), by fractionally distilling the residue at high vacuum (about 1 mm.). There were obtained: (a) a fraction boiling at less than 70° C. at 1 mm., (b) a fraction boiling at 70–85° C. at the same pressure. Fraction (a) was washed with aqueous caustic soda, the insoluble oil was separated and washed with water, and was then redistilled under reduced pressure to give a solid, which was characterised by its melting point, analysis and reduction with tin and hydrochloric acid to acetone, as substantially pure 2,2-dinitropropane. Fraction (b) was dissolved in methanol, the solution was cooled in a solid $CO_2$/methanol mixture, and there was obtained a precipitate which was characterised by its melting point, melting point when mixed with an authentic sample of 1,2-dinitroisobutane, analysis and formation of α-nitroisobutene on treatment with alkali, as 1,2-dinitroisobutane.

On further fractional distillation of the mononitroparaffin fraction there were obtained 2-nitro-2-methylpropane and 2-nitro butane.

The crude washed oil treated in this way yielded about 5% of its weight of 2,2-dinitropropane and about 25% of its weight of 1,2-dinitroisobutane. The remainder was substantially mononitroparaffins.

We claim:

1. A process for the production of 2,2-dinitropropane and 1,2-dinitro-isobutane which comprises heating at a temperature within the range 190°–300° C. isobutane with nitrogen dioxide in the vapour phase, the volumetric ratio of nitrogen dioxide to hydrocarbon in said gas being about 2:1.

2. A process for the production of 2,2-dinitropropane and 1,2-dinitro-isobutane which comprises heating isobutane with nitrogen dioxide in the vapour phase at a temperature within the range 190°–300° C.; condensing the product; degassing the condensate; washing with water; drying with calcium chloride; separating the mononitroparaffins by distillation under reduced pressure; and separating 2,2-dinitropropane and 1,2-dinitro-isobutane by fractional distillation under reduced pressure, the volumetric ratio of nitrogen dioxide to hydrocarbon in said gas being about 2:1.

NORMAN LEVY.
CHARLES WILLIAM SCAIFE.
DOROTHY SHAW TURNER BRYSON.

REFERENCES CITED

The following references are of record in the file of this patent:

UNITED STATES PATENTS

| Number | Name | Date |
|---|---|---|
| 1,967,667 | Hass et al. | July 24, 1934 |
| 2,206,813 | Hass et al. | July 2, 1940 |
| 2,382,241 | Levy | Aug. 14, 1945 |

OTHER REFERENCES

Poni et al., "Jour. Chem. Soc." (London), 1903, I. P. 596.

Poni, "Chem. Cent.," vol. 73 (1902), p. 16.